United States Patent [19]
Nakamura et al.

[11] Patent Number: 5,583,680
[45] Date of Patent: Dec. 10, 1996

[54] CHIRAL SMECTIC LIQUID CRYSTAL DISPLAY HAVING AN INCREASED APPARENT TILT ANGLE

[75] Inventors: Katsutoshi Nakamura; Yukio Hanyu, both of Atsugi, Japan

[73] Assignee: Canon Kabushiki Kaisha, Tokyo, Japan

[21] Appl. No.: 393,885

[22] Filed: Feb. 22, 1995

Related U.S. Application Data

[63] Continuation of Ser. No. 9,085, Jan. 26, 1993, abandoned.

[30] Foreign Application Priority Data

Jan. 29, 1992 [JP] Japan ................................. 4-036900

[51] Int. Cl.$^6$ ..................... G02F 1/141; G02F 1/1337; G09K 19/02
[52] U.S. Cl. ..................... 349/134; 349/172; 349/191
[58] Field of Search ................................. 359/46, 56, 100, 359/78

[56] References Cited

U.S. PATENT DOCUMENTS

| | | | |
|---|---|---|---|
| 4,941,736 | 7/1990 | Taniguchi et al. | 359/100 |
| 5,119,221 | 6/1992 | Nakajima et al. | 359/78 |
| 5,151,804 | 9/1992 | Vevhulst et al. | 359/56 |
| 5,227,905 | 7/1993 | Clark et al. | 359/56 |
| 5,325,219 | 6/1994 | Hanyu et al. | 359/78 |

OTHER PUBLICATIONS

Kuwahara, et al., "Electric–Field–Induced . . . Liquid Crystal Cells", Proceedings of the Sid., vol. 32, No. 4 (1991) 387–91.
Oh–E, et al., "X–Ray Studies . . . Liquid Crystals", Liquid Crystals, vol.11, No. 1 (1992) 101–9.
Orihara, et al., "Effect . . . Liquid Crystal Cell", Jap.Journal Applied Physics, vol. 28, No. 4 (1989) 676–8.
Ouchi, et al., "Smectic layer . . . Evaporation Technique", Jap. Journal Applied Physics, vol.27, No. 11 (1988) 1993–5.

Primary Examiner—William L. Sikes
Assistant Examiner—Ron Trice
Attorney, Agent, or Firm—Fitzpatrick, Cella, Harper & Scinto

[57] ABSTRACT

A ferroelectric liquid crystal device is constituted by a pair of substrates disposed parallel to each other and each having on its inner surface an electrode, an insulating film and an alignment control film, and a ferroelectric liquid crystal disposed between the substrates. The alignment control films on the pair of substrates are provided with uniaxial alignment axes in directions which are substantially parallel and opposite to each other. The ferroelectric liquid crystal is placed in an alignment state showing a pretilt angle $\alpha$ of 5 degrees $<\alpha<45$ degrees formed by transition from a bistable state giving a lower apparent tilt angle to a bistable state giving a higher apparent tilt angle, the action of mechanical or electrical means, such as application of ultrasonic treatment, static load or AC electric field.

10 Claims, 4 Drawing Sheets

LAYER INCLINATION ANGLE δ

CHIRAL SMECTIC LIQUID CRYSTAL DISPLAY HAVING AN INCREASED APPARENT TILT ANGLE

This application is a continuation of application Ser. No. 08/009,085, filed Jan. 26, 1993, now abandoned.

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta a \sin^2(\Delta n d/\lambda)\pi,$$

wherein
- $I_0$: incident light intensity,
- $I$: transmitted light intensity,
- $\theta a$: apparent tilt angle,
- $\Delta n$: refractive index anisotropy,
- $d$: thickness of the liquid crystal layer,
- $\lambda$: wavelength of the incident light.

The apparent tilt angle $\theta a$ in the above-mentioned non-helical structure is recognized as a half of an angle between the average molecular axis directions of liquid crystal molecules in a first stable state and a second stable state. According to the above equation, it is shown that an apparent tilt angle $\theta a$ of 22.5 degrees provides a maximum transmittance and the apparent tilt angle $\theta a$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that an apparent tilt angle $\theta a$ (a half of an angle formed between molecular axes at two stable states) in a ferroelectric liquid crystal with a non-helical structure obtained by alignment with an alignment control film of the prior art has become smaller as compared with a tilt angle Ⓗ inherent to the liquid crystal.

SUMMARY OF THE INVENTION

An object of the present invention is to provide an increased apparent tilt in a liquid crystal cell using a ferroelectric liquid crystal so as to increase the luminance contrast.

According to the present invention, there is provided a ferroelectric liquid crystal device, comprising a pair of substrates disposed parallel to each other and each having on its inner surface an electrode, an insulating film and an alignment control film, and a ferroelectric liquid crystal disposed between the substrates, the alignment control films on the pair of substrates being provided with uniaxial alignment axes in directions which are substantially parallel and opposite to each other, said ferroelectric liquid crystal being placed in an alignment state showing a pretilt angle $\alpha$ of 5 degrees $<\alpha<$ 45 degrees formed by transition from a bistable state giving a lower apparent tilt angle to a bistable state giving a higher apparent tilt angle. The transition is caused, e.g., by application of mechanical means or electrical means. The ferroelectric liquid crystal may preferably be placed in an alignment state satisfying Ⓗ$<\alpha+\delta$, wherein $\alpha$ denotes a pretilt angle, Ⓗ denotes a tilt angle and $\delta$ denotes an SmC layer inclination angle. FIG. 4 illustrates a definition of $\alpha$, Ⓗ and $\delta$, wherein reference numeral 41 denotes a smectic layer, and 42 denotes a liquid crystal molecule adjacent to a boundary with a substrate 43.

DESCRIPTION OF THE PREFERRED EMBODIMENTS

Figure 1:
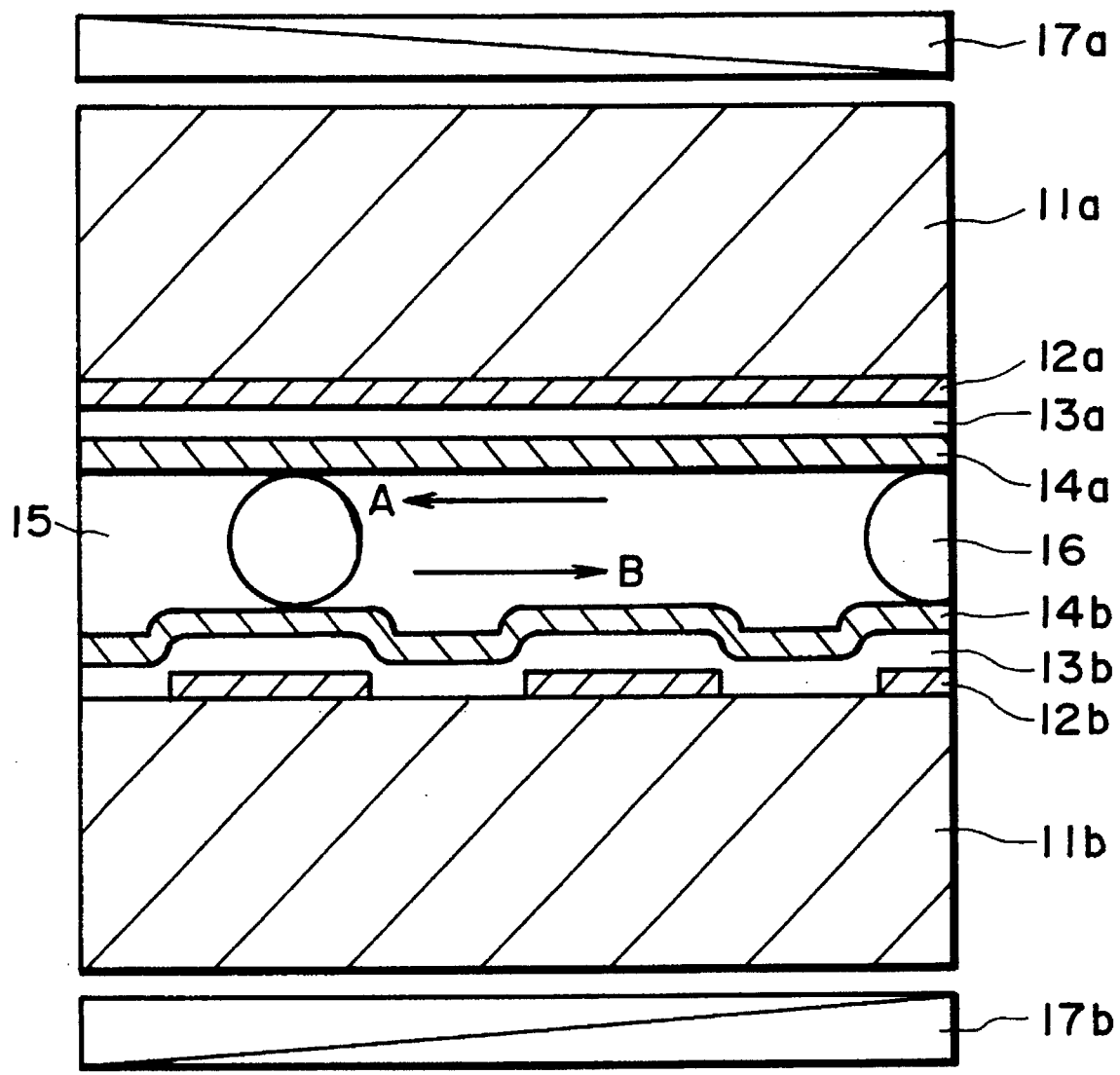
FIG. 1 is a schematic sectional view of an embodiment of the ferroelectric liquid crystal device according to the present invention.

FIG. 1 is a schematic sectional view showing an embodiment of the ferroelectric liquid crystal device according to the invention. Referring to FIG. 1, the liquid crystal device includes a pair of substrates (glass plates) 11a and 11b coated with transparent electrodes 12a and 12b of, e.g., In₂O₃ or ITO (indium tin oxide), then with 200 to 3000 Å-thick insulating films 13a and 13b of, e.g., SiO₂, TiO₂ or Ta₂O₅ and then with 50 to 1000 Å-thick alignment control films 14a and 14b. The alignment control films are provided with uniaxial alignment axes, as by rubbing in directions A and B which are substantially parallel and opposite to each other. Between the substrates 11a and 11b is disposed a ferroelectric smectic liquid crystal 15. The spacing between the substrates 11a and 11b is held at a value sufficiently small (e.g., 0.1–3 μm) to suppress the formation of a helical structure of the ferroelectric smectic liquid crystal, thus providing a bistable alignment state of the ferroelectric smectic liquid crystal. The above-mentioned sufficiently small space is held by spacer beads 16 of, e.g., silica or alumina. The entire structure may be sandwiched between a pair of polarizers 17a and 17b to form an optical modulation device. The alignment control films 14a and 14b may comprise a polymer film, preferably a film of a polymer providing a high pretilt angle, such as a fluorine-containing polyimide. Alternatively, the alignment control films 14a and 14b may comprise a film of, e.g., SiO formed by evaporation at an evaporation angle of about 85 degrees from the normal to the substrates 11a and 11b.

The ferroelectric liquid crystal used in the present invention may be in a chiral smectic phase, such as chiral smectic C phase (SmC*), H phase (SmH*), I phase (SmI*), K phase (SmK*), or G phase (SmG*). A preferred class of ferroelectric liquid crystals may include those showing cholesteric phase on a higher temperature side, e.g., a phenylpyrimidine-based mixture liquid crystal (A) showing the following phase transition series and parameters at 30° C.

Tilt angle $\textcircled{H}$=15.6 degrees

Spontaneous polarization Ps=−6.2 nC/cm²

Hereinbelow, the present invention will be described more specifically based on Examples.

EXAMPLE 1

A 1.1 mm-thick glass plate provided with transparent electrodes was coated with a film of tantalum oxide by sputtering and then with a 1%-NMP (N-methylpyrrolidone) solution of a polyamide acid ("LQ1802", available from Hitachi Kasei K.K.) by a spinner rotating at 2000 rpm for 20 sec, followed by baking at 270° C. for 1 hour to form a 200 Å-thick polyimide alignment film, which was then rubbed in one direction. This substrate and another substrate treated in the same manner were applied to each other with a spacing of 1.5 μm therebetween so that their rubbing directions were parallel and opposite to each other to form a cell. The cell showed a pretilt angle α of 17 degrees as measured by the crystal rotation method as described at Jpn. J. Appl. Phys. vol. 19 (1980), No. 10, Short Notes 2013.

More specifically, the cell was filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

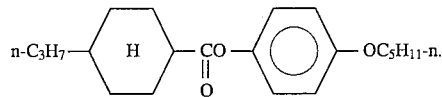

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle α, $$\sin 2\alpha = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

Another cell prepared in the same manner as above was filled with the above-mentioned mixture liquid crystal (A).

The liquid crystal cell thus formed was aged at 100° C. for 3 hours and subjected to measurement of an apparent tilt angle θ at 30° C. whereby a value of about 10 degrees was obtained. Then, the cell was subjected to 2–3 minutes of an ultrasonic treatment in a water vessel-type ultrasonic apparatus (ultrasonic cleaner "BRANSONIC 521", available from Bransonic Co.). Then, the apparent tilt angle of the liquid crystal cell was measured to be about 14.5 degrees showing an increase of 4.5 degrees.

EXAMPLE 2

The liquid crystal cell prepared in the same manner as in Example 1 up to aging at 100° C. for 3 hours and showing an apparent tilt angle of about 10 degrees was placed between a parallel plate and a static load of 5 kg.f/cm² was applied thereto for 10 minutes. As a result of measurement, the liquid crystal cell showed an increased apparent tilt angle of 14.0 degrees.

EXAMPLE 3

The liquid crystal cell prepared in the same manner as in Example 1 up to aging at 100° C. for 3 hours and showing an apparent tilt angle of about 10 degrees was subjected to application of alternating rectangular voltage waves of ±5 volts and 12.5 kHz for 30 sec and then to measurement of an apparent tilt angle to obtain a value of 14.5 degrees.

EXAMPLE 4

Figure 2A:
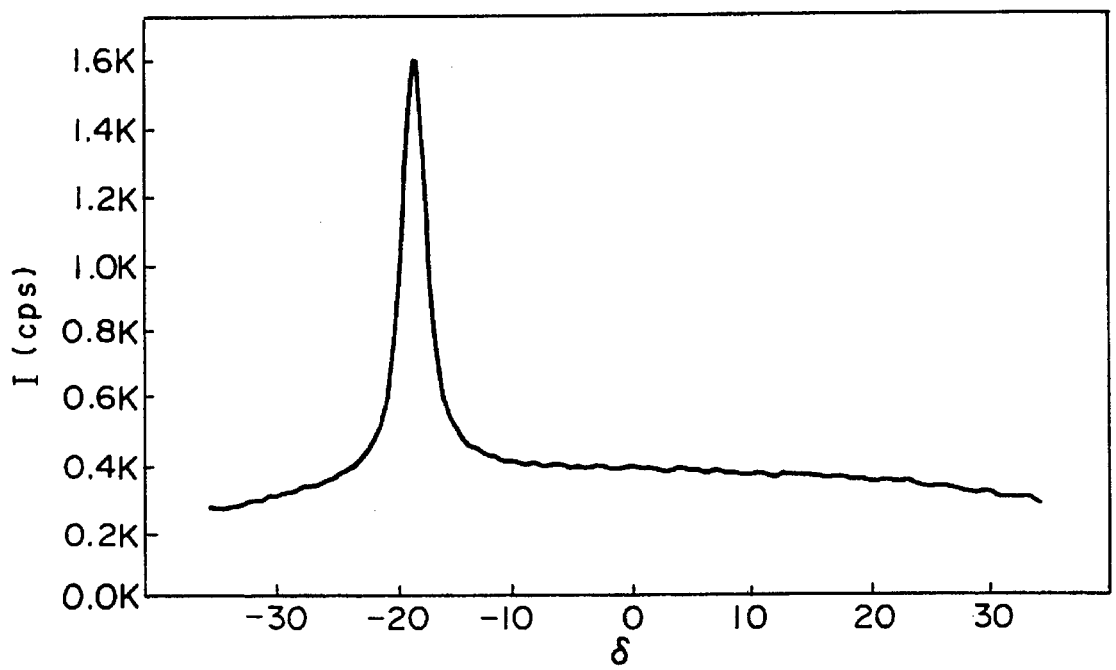
FIGS. 2A and 2B are X-ray diffraction charts obtained in Examples.

An 80 μm-thick glass plate provided with a transparent electrode was subjected to application of an application-type insulating film precursor (Ti:Si=1:1, available from Tokyo Ohka Kogyo K.K.) followed by baking at 300° C. to form a 1200 Å-thick film, which was then coated with 1%-NMP solution of polyamide acid ("LQ1802" available from Hitachi Kasei K.K.), followed by baking at 270° C. for 1 hour and rubbing in one direction to form a 200 Å-thick alignment control film. This substrate and another substrate treated in the same manner were applied to each other with a spacing of 1.5 μm therebetween so that their rubbing directions were parallel and opposite to each other to form a cell. The cell was subjected to measurement of a pretilt angle as measured by a layer inclination angle of an SmA liquid crystal by the X-ray diffraction method, whereby a value of 17.4 degrees was obtained. Then, the cell was subjected to measurement of an apparent tilt angle θa, whereby a value of 11 degrees was obtained. Then, the cell was subjected to application of alternating rectangular waveforms of ±5 volts and 10 kHz. The resultant cell showed an apparent tilt angle θa of 14.5 degrees and an X-ray diffraction pattern shown in FIG. 2A. Thus, the pattern showed a single peak of a narrow width at a layer inclination angle δ of about −18 degrees and thus suggested that the layer structure 32 was homogeneously inclined (referred to as a stretched chiral smectic layer structure) as shown in FIG. 3A. Then, the cell was subjected to a realigning treatment including heating to a liquid phase and then gradual cooling to SmC*, whereby the resultant apparent tilt angle θa was reduced to about 11 degrees, and an X-ray diffraction pattern as shown in FIG. 2B was obtained.

Figure 2B:
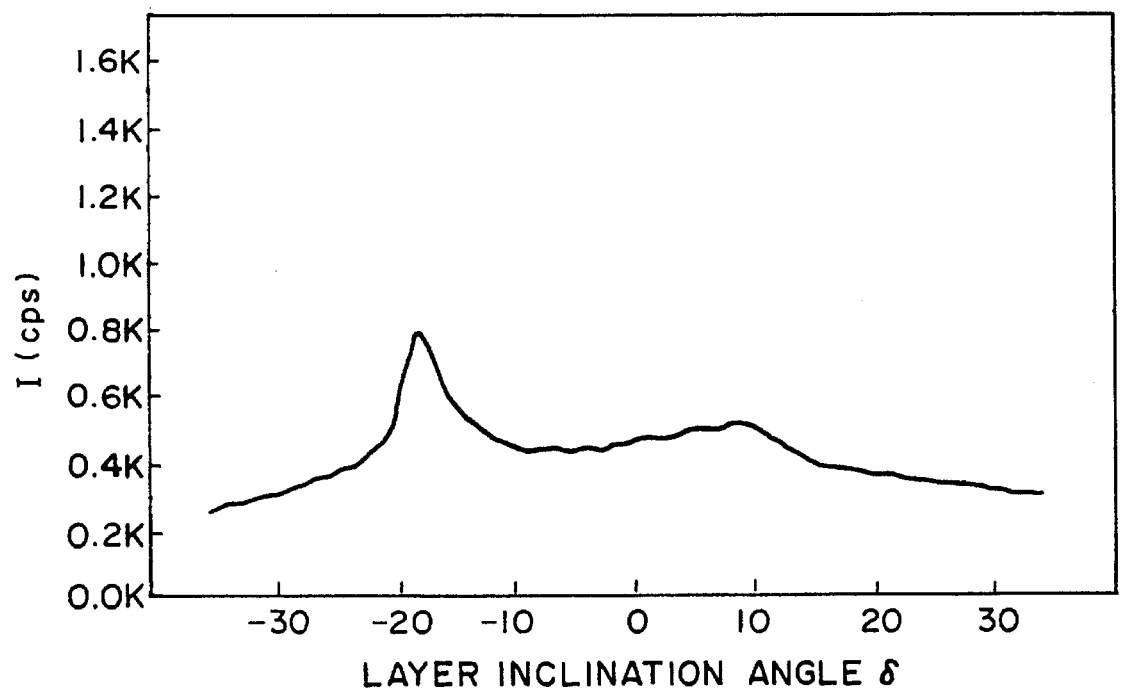
Figure 3A:
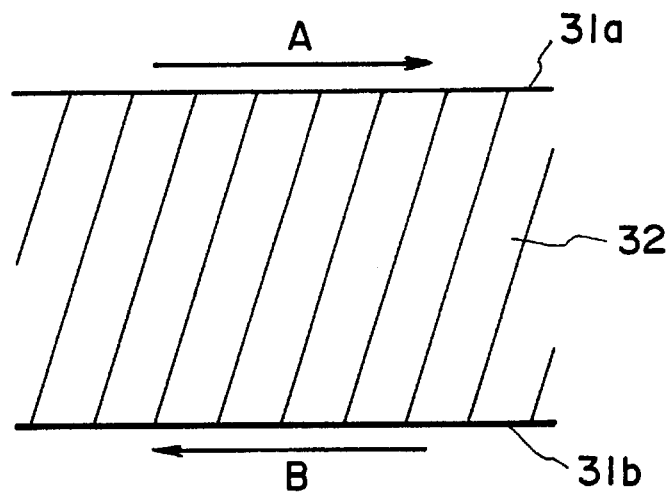
FIGS. 3A–3C are schematic sectional views for illustrating a relationship between an apparent tilt angle and a smectic layer structure.
Figure 3B:
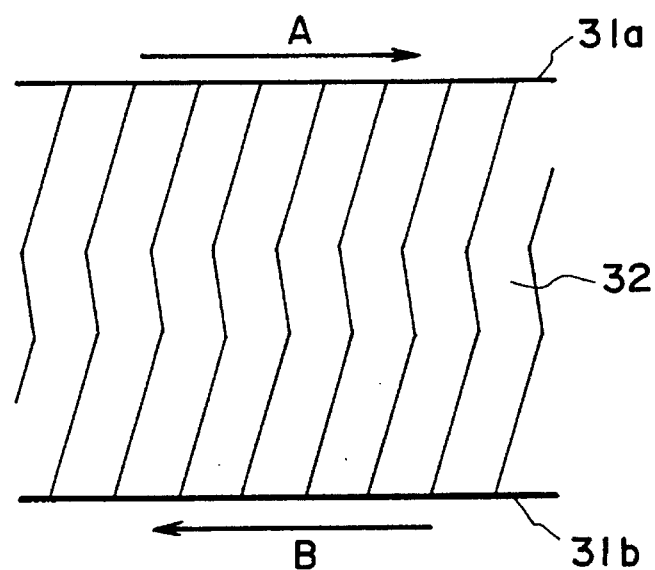
Figure 3C:
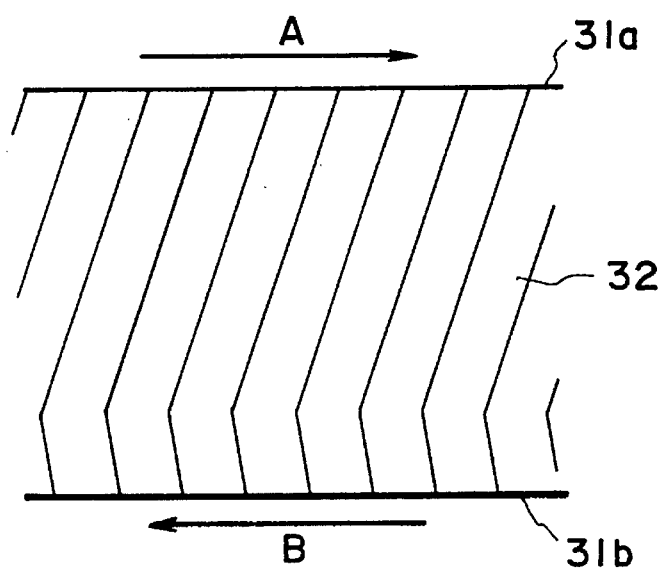
Figure 4:
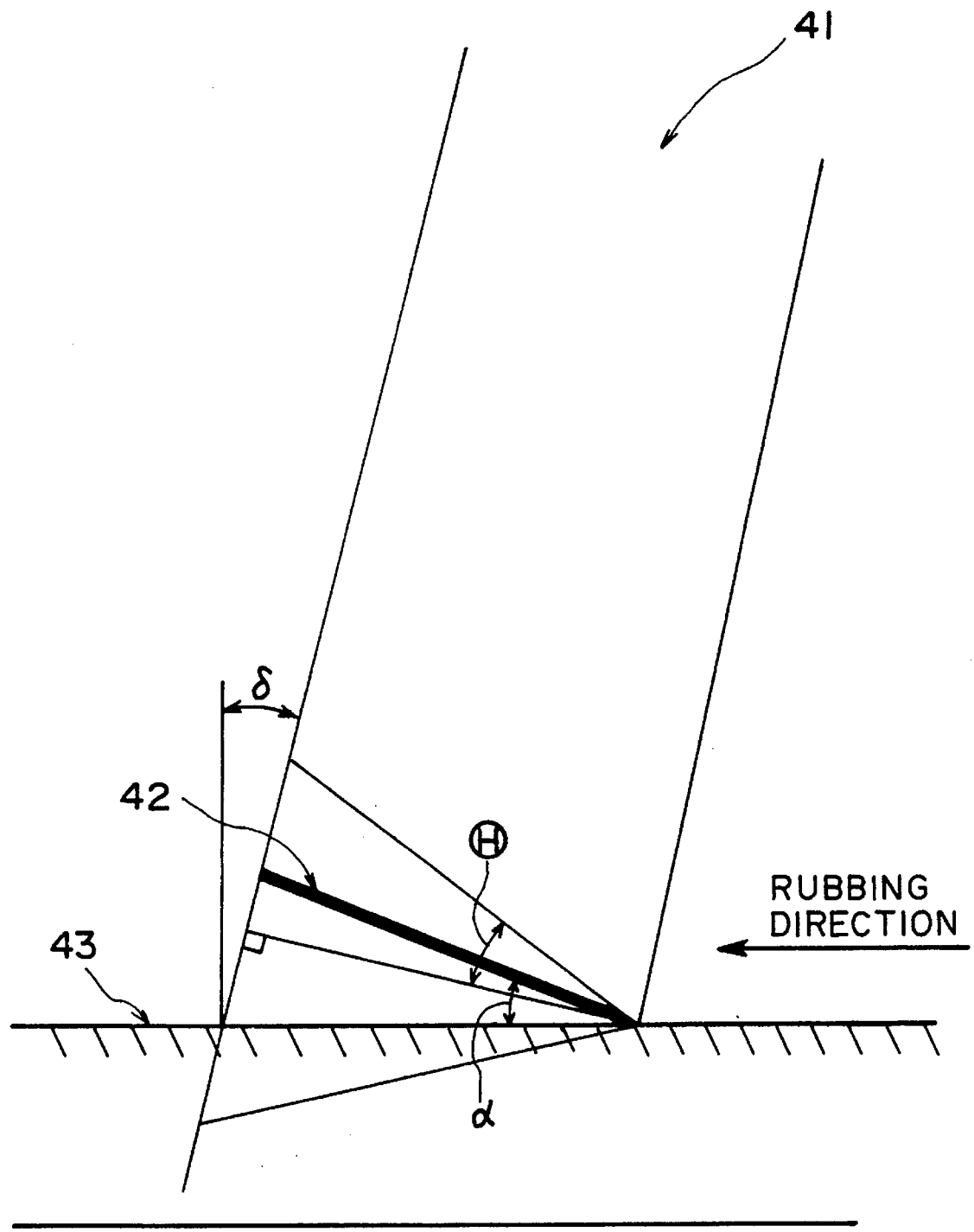
FIG. 4 is an illustration of a pretilt angle $\alpha$, a tilt angle Ⓗ, and a smectic layer inclination angle $\delta$.

The X-ray diffraction pattern shown in FIG. 2B shows a smaller intensity and two broad peaks an angles δ of about −18 degrees and 9 degrees, thus suggesting the presence of smectic layer structures showing two layer inclination angles. FIGS. 3B and 3C show two layer structures likely to be present corresponding to the X-ray diffraction pattern.

As described above, according to the present invention, there is provided a ferroelectric liquid crystal device showing an increased apparent tilt angle, thus providing an excellent contrast and a clear image display.

What is claimed is:

1. A ferroelectric liquid crystal device, comprising:

a pair of substrates, each defining an inner surface being disposed parallel to each other and having an electrode, an insulating film and an alignment control film; and a ferroelectric liquid crystal disposed between the substrates, wherein the alignment control films on the pair of substrates are provided with uniaxial alignment axes in directions which are substantially parallel and opposite to each other, said ferroelectric liquid crystal being in a bistable alignment state comprising a stretched smectic layer structure formed by transition from a bent smectic layer structure, said stretched smectic layer structure having a higher apparent tilt angle than that of said bent smectic layer structure, said stretched smectic layer structure satisfying $5°<\alpha<45°$ and $\text{\textcircled{H}}<\alpha+\delta$ wherein $\alpha$ is pretilt angle, $\text{\textcircled{H}}$ is tilt angle and $\delta$ is inclination angle.

2. A device according to claim 1, wherein the alignment control films comprise a rubbed polyimide containing fluorine.

3. A device according to claim 1, wherein the alignment control films comprise a film of SiO formed by evaporation from a direction forming an angle of about 85 degrees with respect to a normal to an adjacent substrate.

4. A device according to claim 1, wherein the insulating films comprise a film of $SiO_2$, $TiO_2$ or $Ta_2O_5$.

5. A device according to claim 1, wherein the alignment control films have a thickness of 50–2000 Å.

6. A device according to claim 1, wherein the ferroelectric liquid crystal is disposed in a layer having a thickness of 0.1–3 μm.

7. A device according to claim 1, wherein the pair of substrates are held with a spacing therebetween given by spacer beads of silica or alumina.

8. A device according to claim 1, wherein the ferroelectric liquid crystal comprises a pyrimidine-based mixture liquid crystal.

9. A liquid crystal device, comprising:

a pair of substrates bearing thereon opposed alignment control films, each alignment control film providing a uniaxial alignment axis, said liquid crystal device further including a chiral smectic liquid crystal disposed between the substrates, wherein the alignment control films are oriented with their uniaxial alignment axes in directions which are substantially parallel and opposite to each other so as to align liquid crystal molecules at a pretilt angle $\alpha$ of 5°–45°;

said chiral smectic liquid crystal being aligned with its own helical structure suppressed and forming plural smectic layers each comprising plural liquid crystal molecules, said smectic layers being stretched and inclined with respect to the substrates respectively adjacent thereto;

the chiral smectic liquid crystal being provided with an increased apparent tilt angle by prior application of an AC voltage wherein said stretched smectic layers provide an inclination angle $\delta$ and a tilt angle $\text{\textcircled{H}}$ which satisfy $\text{\textcircled{H}}<\alpha+\delta$.

10. A device according to claim 9, wherein the alignment control films comprise a polyimide containing fluorine.

* * * * *

UNITED STATES PATENT AND TRADEMARK OFFICE
CERTIFICATE OF CORRECTION

PATENT NO. : 5,583,680

DATED : December 10, 1996

INVENTOR(S) : KATSUTOSHI NAKAMURA ET AL.

It is certified that error appears in the above-indentified patent and that said Letters Patent is hereby corrected as shown below:

<u>COLUMN 5</u>

Line 30, "an" should read --at--.

<u>COLUMN 6</u>

Line 42, "thereto;" should read --thereto; and--.

Signed and Sealed this

Thirteenth Day of May, 1997

*Attest:*

BRUCE LEHMAN

*Attesting Officer*    Commissioner of Patents and Trademarks